United States Patent
Beri et al.

(10) Patent No.: US 10,332,290 B2
(45) Date of Patent: Jun. 25, 2019

(54) FAST, COVERAGE-OPTIMIZED, RESOLUTION-INDEPENDENT AND ANTI-ALIASED GRAPHICS PROCESSING

(71) Applicant: Adobe Inc., San Jose, CA (US)

(72) Inventors: Tarun Beri, Noida (IN); Vineet Batra, Delhi (IN)

(73) Assignee: Adobe Inc., San Jose, CA (US)

(*) Notice: Subject to any disclaimer, the term of this patent is extended or adjusted under 35 U.S.C. 154(b) by 325 days.

(21) Appl. No.: 15/075,464

(22) Filed: Mar. 21, 2016

(65) Prior Publication Data

US 2017/0270710 A1    Sep. 21, 2017

(51) Int. Cl.
- G06T 17/20    (2006.01)
- G06T 11/40    (2006.01)
- G06T 11/20    (2006.01)

(52) U.S. Cl.
CPC .......... G06T 11/40 (2013.01); G06T 11/203 (2013.01)

(58) Field of Classification Search
CPC ................................ G06T 17/20; G06T 1/20
See application file for complete search history.

(56) References Cited

U.S. PATENT DOCUMENTS

| | | | | |
|---|---|---|---|---|
| 5,977,977 A * | 11/1999 | Kajiya | ............ | G06T 11/001 345/418 |
| 7,605,825 B1 | 10/2009 | Lau et al. | | |
| 7,868,887 B1 * | 1/2011 | Yhann | ............ | G06T 11/203 345/442 |
| 8,044,955 B1 * | 10/2011 | Yhann | ............ | G06T 17/20 345/419 |
| 8,072,452 B1 * | 12/2011 | Brown | ............ | G06T 17/20 345/419 |
| 2005/0057568 A1 * | 3/2005 | Sfarti | ............ | G06T 17/30 345/442 |
| 2008/0079728 A1 * | 4/2008 | Sugita | ............ | G06T 11/203 345/441 |

(Continued)

FOREIGN PATENT DOCUMENTS

EP    1105844 A1 *    6/2001    .......... G06T 15/005

OTHER PUBLICATIONS

Kilgard, Mark J., "GPU-Accelerated Path Rendering", Nov. 2012, ACM Transactions on Graphics (TOG), vol. 31, pp. 172:1-172:10, [retrieved on Sep. 28, 2018], Retrieved from the Internet <URL:https://dl.acm.org/citation.cfm?id=2366191>.*

(Continued)

*Primary Examiner* — Barry Drennan
*Assistant Examiner* — Terrell M Robinson
(74) *Attorney, Agent, or Firm* — Brake Hughes Bellermann LLP

(57) ABSTRACT

Technology related to efficient, coverage-optimized, resolution-independent, and anti-aliased graphics processing is described. Uniquely, an example system may include a graphics processing unit configured to receive a plurality of vertices representing a control polygon of a curve and expanding the control polygon of the curve. The graphic processing unit may further tessellate the control polygon into a plurality of tiles, select a subset of tiles from the plurality of tiles based on satisfying selection criteria, rasterize fragments using the selected subset of tiles, and render the curve based on the fragments.

19 Claims, 13 Drawing Sheets

(56) References Cited

U.S. PATENT DOCUMENTS

| | | | | |
|---|---|---|---|---|
| 2011/0285711 | A1* | 11/2011 | Kilgard | G06T 15/005 345/426 |
| 2011/0285721 | A1* | 11/2011 | Kilgard | G06T 11/203 345/442 |
| 2012/0069037 | A1* | 3/2012 | Ziemski | G06T 11/001 345/586 |
| 2013/0120380 | A1* | 5/2013 | Kallio | G06T 15/005 345/421 |
| 2014/0043339 | A1* | 2/2014 | Taylor | G06T 11/203 345/443 |

OTHER PUBLICATIONS

"Draw Quadratic Curve on GPU", Sep. 28, 2015, Stack Overflow, pp. 1-3, [retrieved on Oct. 1, 2018], Retrieved from the Internet <URL:https://stackoverflow.com/questions/31336454/draw-quadratic-curve-on-gpu>.*

Kokojima, "Resolution independent rendering of deformable vector objects using graphics hardware", 2006, ACM, SIGGRAPH '06, pp. 1 (Year: 2006).*

Charles Loop et al. "Resolution Independent Curve Rendering using Programmable Graphics Hardware" dated 2005, 10 pages.

"Fragment Shader", http://www.opengl.org/wiki/Fragment_Shader, last edited Jun. 15, 2015, 7 pages.

"Geometry Shader", downloaded from http://www.opengl.org/wiki/Geometry_Shader, last edited Aug. 4, 2015, 7 pages.

"Tessellation", downloaded from http://www.opengl.org/wiki/Tessellation, last edited Aug. 4, 2015, 5 pages.

"Vertex Shader", downloaded from http://www.opengl.org/wiki/Vertex_Shader, last edited Jul. 4, 2015, 5 pages.

Chan, Eric , "Fast Antialiasing Using Prefiltered Lines on Graphics Hardware", downloaded from http://people.csail.mit.edu/ericchan/articles/prefilter, Feb. 28, 2004, 6 pages.

* cited by examiner

FAST, COVERAGE-OPTIMIZED, RESOLUTION-INDEPENDENT AND ANTI-ALIASED GRAPHICS PROCESSING

BACKGROUND

This application relates to graphics processing, and in some example embodiments, more specifically relates to efficiently rendering Bezier curves.

Complex curves, such as quadratic Bezier curves are the basic building blocks of many applications, such as various vector graphics applications (e.g., Adobe Flash™), and may be used to represent glyph outlines in various different font standards (e.g., TrueType).

Some more graphic-intensive applications (e.g., Illustrator®) may stroke cubic Beziers by approximating them to lower order Quadratic Bezier curves or straight lines and then rendering the approximated Quadratic Bezier curves or straight lines. Stroking a complex curve (e.g., quadratic Bezier curve) is fundamentally a computationally time consuming and intensive operation. Even when executed on a graphics processing unit (GPU), such a stroking task can be very slow, as most current techniques employ central processing unit (CPU) for lower order approximation and tessellation of a control shape bounding the approximation into tiles, and then offload the rendering operation using the tiles to the GPU. This partial CPU involvement often makes the stroking process resolution-dependent. Every time the resolution changes, the CPU has to re-tessellate the Bezier curve control shape and then again offload the rendering to GPU.

One solution, which discusses approaches for resolution-independent curve rendering using programmable graphics hardware (hereinafter Loop-Blinn), attempts to address the problem of requiring the CPU to re-determine and tessellate the control shape using a resolution-independent technique that does not require CPU tessellation. In particular, Loop-Blinn describes a process that computes a set of texture coordinates defining a control triangle that corresponds to the control points of a Bezier curved line, and evaluating the texture coordinates using a pixel shader to determine if corresponding pixels are inside or outside the curved line. However, the solution described by Loop-Blinn, in its current form, suffers from at least the problem of having to process too many fragments in order to render the curved lines (referred to as over-coverage), and thus has proven to be too slow for practical use. Further, this solution often fails to resolve the ends of the curved lines proximate the control points sufficiently (referred to as under-coverage).

Another problem with existing Bezier-based solutions is that they are generally unable to handle thin strokes, such as strokes having a width less than one pixel especially at low-resolution levels. These solutions attempt to address this deficiency by using separate processing logic for rendering a stroke when it is thin (e.g., using prefiltered lines) as compared to when the line is not thin, which disadvantageously makes the implementation resolution dependent.

SUMMARY

According to one innovative aspect of the subject matter being described in this disclosure, a system includes a graphics processing unit and a memory coupled to the graphics processing unit and storing instructions, which when executed, cause the graphics processing unit to various perform operations. These operations may comprise receiving a plurality of vertices representing a control polygon of a curve; expanding the control polygon of the curve; tessellating the control polygon into a plurality of tiles; selecting a subset of tiles from the plurality of tiles based on satisfying selection criteria; rasterizing fragments using the selected subset of tiles; and rendering the curve based on the fragments.

In general, another innovative aspect of the subject matter described in this disclosure may be embodied in methods that include receiving, at a graphics processing unit, a plurality of vertices representing a control polygon of a curve; expanding, using the graphics processing unit, the control polygon of the curve; tessellating, using the graphics processing unit, the control polygon into a plurality of tiles; selecting, using the graphics processing unit, a subset of tiles from the plurality of tiles based on satisfying selection criteria; rasterizing, using the graphics processing unit, fragments using the selected subset of tiles; and rendering, using the graphics processing unit, the curve based on the fragments. Other innovative aspects include corresponding systems, methods, apparatus, and computer program products.

This Summary is provided to introduce an example selection of concepts that are further described below in the Detailed Description. This Summary is not intended to identify specific key or essential features of the claimed subject matter, nor is it intended to be used as an aid in determining the scope of the claimed subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
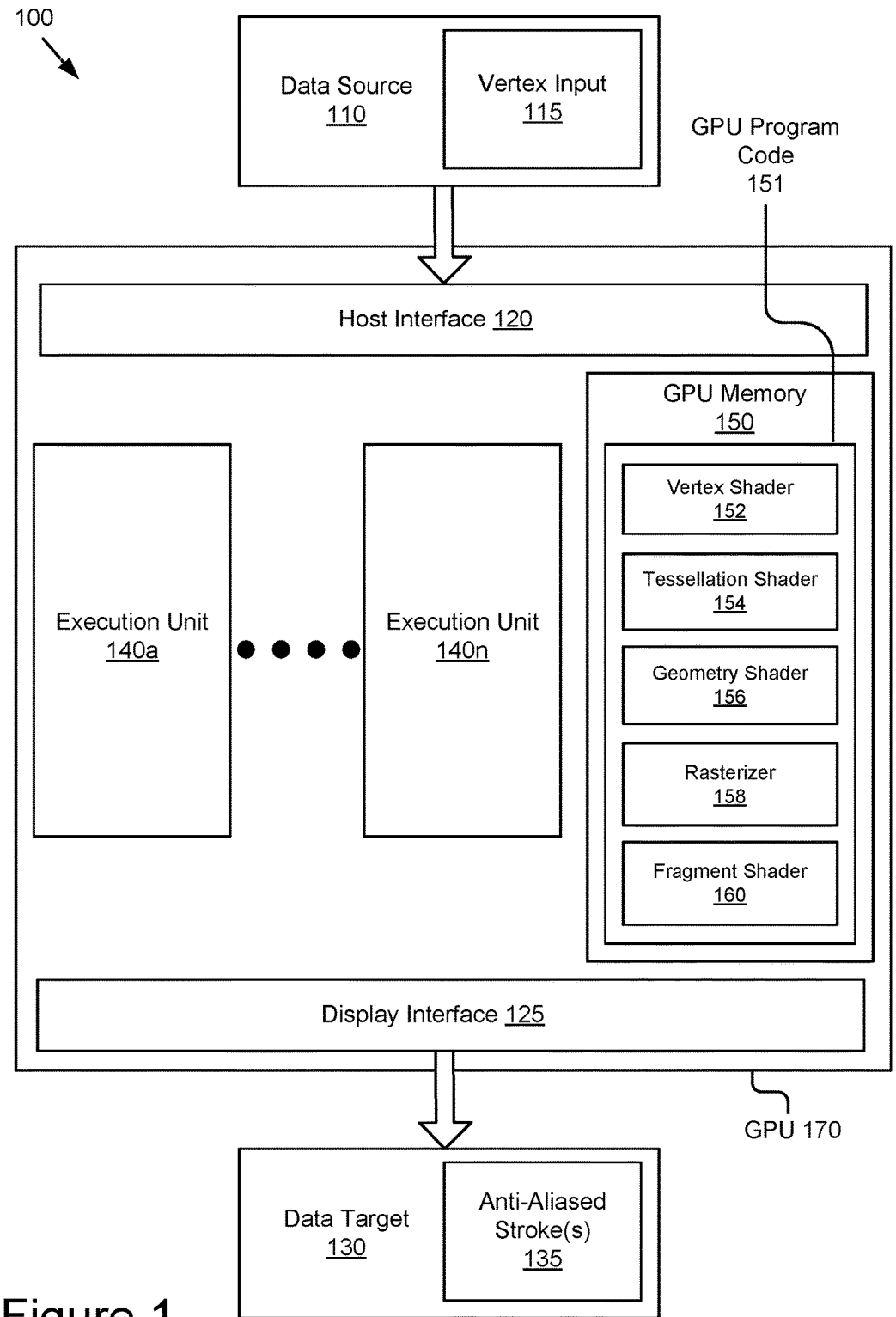
FIG. 1 is a block diagram illustrating an example system for graphics processing.
Figure 9:
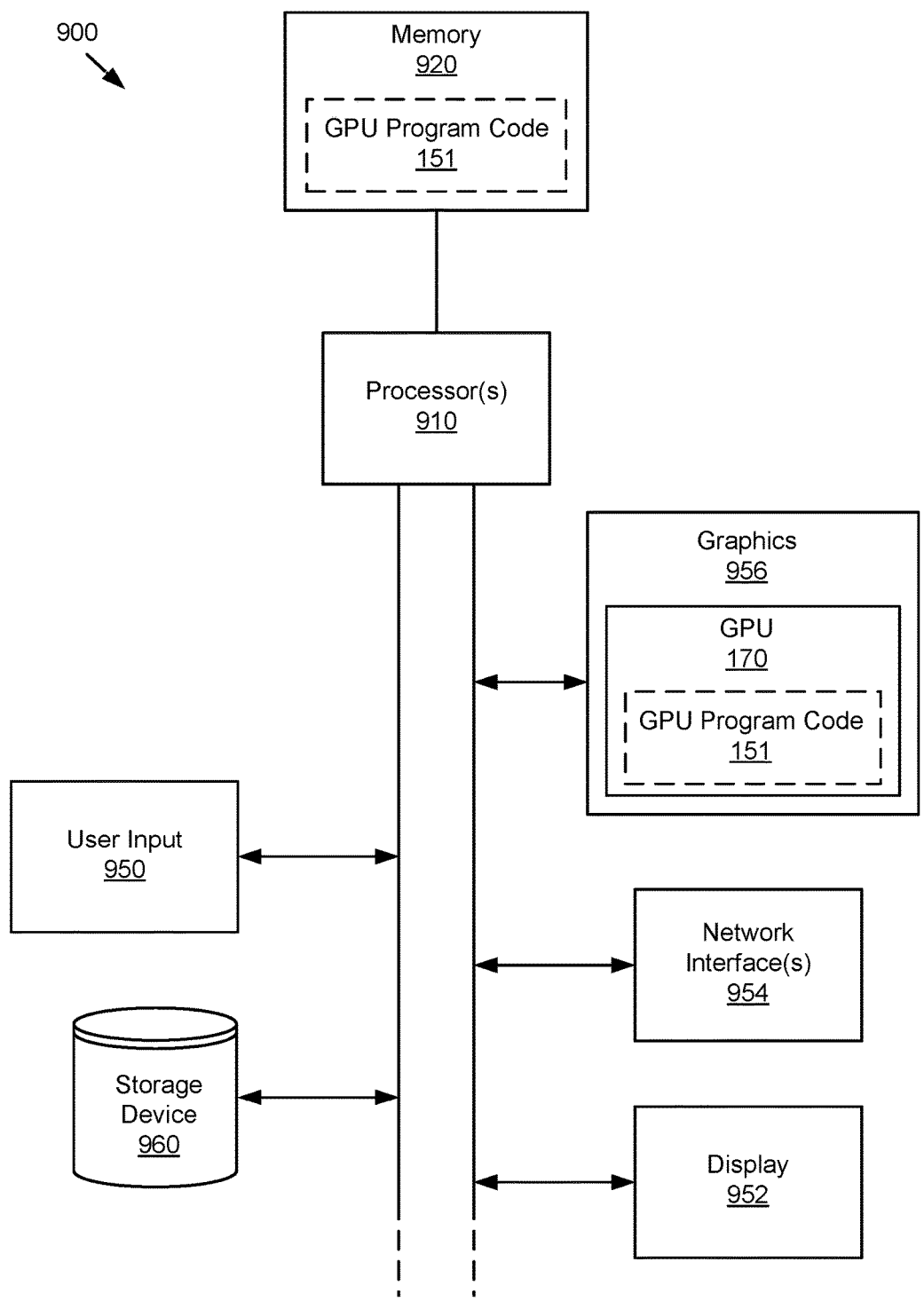
FIG. 9 is a block diagram illustrating an example computer system.

FIG. 1 is a block diagram of an example computing system 100 for graphics processing. As shown, the computing system 100 includes a data source 110, a GPU 170, and a data target 130. The data source 110 may be any electronic data source configured to provide data, such as a CPU or other suitable electronic computational component. In some embodiments, the GPU 170 may comprise one or more dedicated graphics rendering device(s) associated with a computer system. In some embodiments, the GPU 170 may be integrated with a CPU, such as the data source 110 and/or one or more of the processors 910, as shown in FIG. 9. An example of a suitable computer system 900 is depicted in FIG. 9, and discussed in further detail below.

Referring again to FIG. 1, the GPU 170 may include numerous specialized components configured to optimize the speed of rendering graphics output. For example, a GPU 170 may include specialized components for rendering three-dimensional structures and applying textures to surfaces. For the sake of illustration, however, and so as not to obscure the description of the system 100, FIG. 1 may not necessarily include all of components of the example GPU 170. It is contemplated that GPU architectures other than the example architecture of FIG. 1 may be suitable for implementing the techniques described herein. Suitable GPUs 170 may be commercially available from vendors such as NVIDIA™ Corporation, ATI® Technologies, Intel® Corporation and others.

The GPU 170 may include a host interface 120 configured to communicate with the data source 110 (e.g., a communications bus and/or processor(s) 910 of a host computer system 900, or the host system itself). For example, the data source 110 may provide input data and/or executable program code to the GPU 170. In some embodiments, the host interface 120 may permit the movement of data in both directions between the GPU 170 and the data source 110. The GPU 170 may also include a display interface 125 for providing output data to a data target 130. For example, the data target 130 may comprise a display device 952, and the GPU 170 (along with other graphics components and/or interfaces 956) may "drive" the display 952 by providing graphics data (e.g., anti-aliased strokes 135) at a particular rate from a frame buffer.

In some embodiments, the GPU 170 may include internal memory 150. The GPU memory 150, also referred to herein as video memory or VRAM, may comprise random-access memory (RAM) or another suitable memory type, which is accessible to other GPU components. As will be described in greater detail below, the GPU memory 150 may be used in some embodiments to store various types of data and instructions such as input data, output data, intermediate data, program instructions for performing various tasks, etc. In some embodiments, the GPU 170 may also be configured to access memory 920 of a host computer system 900 via the host interface 120.

In some embodiments, the GPU 170 may include a plurality of execution units 140a-140n, as illustrated in FIG. 1. Using the plurality of execution units 140a-140n, the GPU 170 may process a plurality of tasks in a substantially parallel manner, such that a plurality of the execution units 140a-140n are simultaneously in use. For instance, various execution units 140a-140n may process, in parallel, various pixels, fragments and/or vectorized RGBA/CMYKA data. As additional examples, various shaders, such as the geometry shader 156, may process data, such as different primitives (e.g., triangles) concurrently; all primitives concurrently; or a sub-selection of primitives concurrently. In some further embodiments, each of the execution units 140a-140n may perform tasks independent of the other execution units 140a-140n.

The GPU 170 may be configured to process multi-channel input and produce multi-channel output. In some embodiments, the data in one channel of the multi-channel input may be processed by the GPU 170 independently of the data in the other channels. In some embodiments, the multi-channel input and multi-channel output may comprise graphical data having a plurality of channels. For example, the plurality of channels may represent RGBA data (data comprising separate channels for red, green, blue, and alpha data), vertices, textures, etc. The plurality of channels may comprise overlapping channels in a rectangular area of graphical data. In some embodiments, the number of the channels in the multi-channel input and multi-channel output may be equal to the number of execution units in the GPU 170 for optimal parallel processing. In some embodiments, the GPU 170 may include additional components configured to control the plurality of execution units 140a-140n, such as by distributing portions of the multi-channel input to individual execution units. In this manner, the GPU 170 may perform operations on multi-channel input data.

The GPU 170 may also be configured to perform single-channel operations on single-channel data using only one of the plurality of execution channels 140a-140n. A single-channel operation may comprise an operation on non-vectorized input or input having only one channel (e.g., graphical data having only one channel). When the GPU 170 is used in this manner, however, the remaining execution channels may be idle.

By performing the polygon sizing, tessellation, selection, and rasterization described herein, such as with reference to FIGS. 2A-8, on the GPU, the computational load on the host CPU may be beneficially reduced. The GPU program code 151, which comprises instructions for performing the techniques described herein, such as those discussed with reference to FIGS. 2A-8, may be provided to the GPU 170. The GPU program code 151 may be stored in the GPU memory 150 and executed by one or more of the execution channels 140a-140n. The GPU program code 151 may be configured to fetch and process a plurality of channels of input data in a parallel manner. In some embodiments, the GPU program code 151 may be provided to the GPU 170 by the CPU 910 or other components of the computer system shown in FIG. 9. In further embodiments, the GPU program code 151 may be native to the GPU 170. Other suitable variations are also possible and contemplated.

As shown, the GPU program code 151 may comprise a vertex shader 152, a tessellation shader 154, a geometry shader 156, a rasterizer 158, and a fragment shader 160.

The vertex shader 152 comprises program instructions that are executable by the GPU 170, among other things, to process vertex input 115 received from the data source 110. The vertex input 115 includes the vertex data defining the corners of the control polygon. The data source 110 may upload the vertex input 115 to the GPU 170 via the host interface 120. For instance, in an example involving a quadratic Bezier curve, the data source 110 (e.g., CPU) uploads the control triangle's vertex data to the GPU 170. The vertex input 115 may be resolution independent and, advantageously, the CPU may not be required to re-provide the vertex input 115 should an event occur that alters the displayed resolution of the curve on-screen, such as the zooming-in on the curve by the user.

Figure 4A:
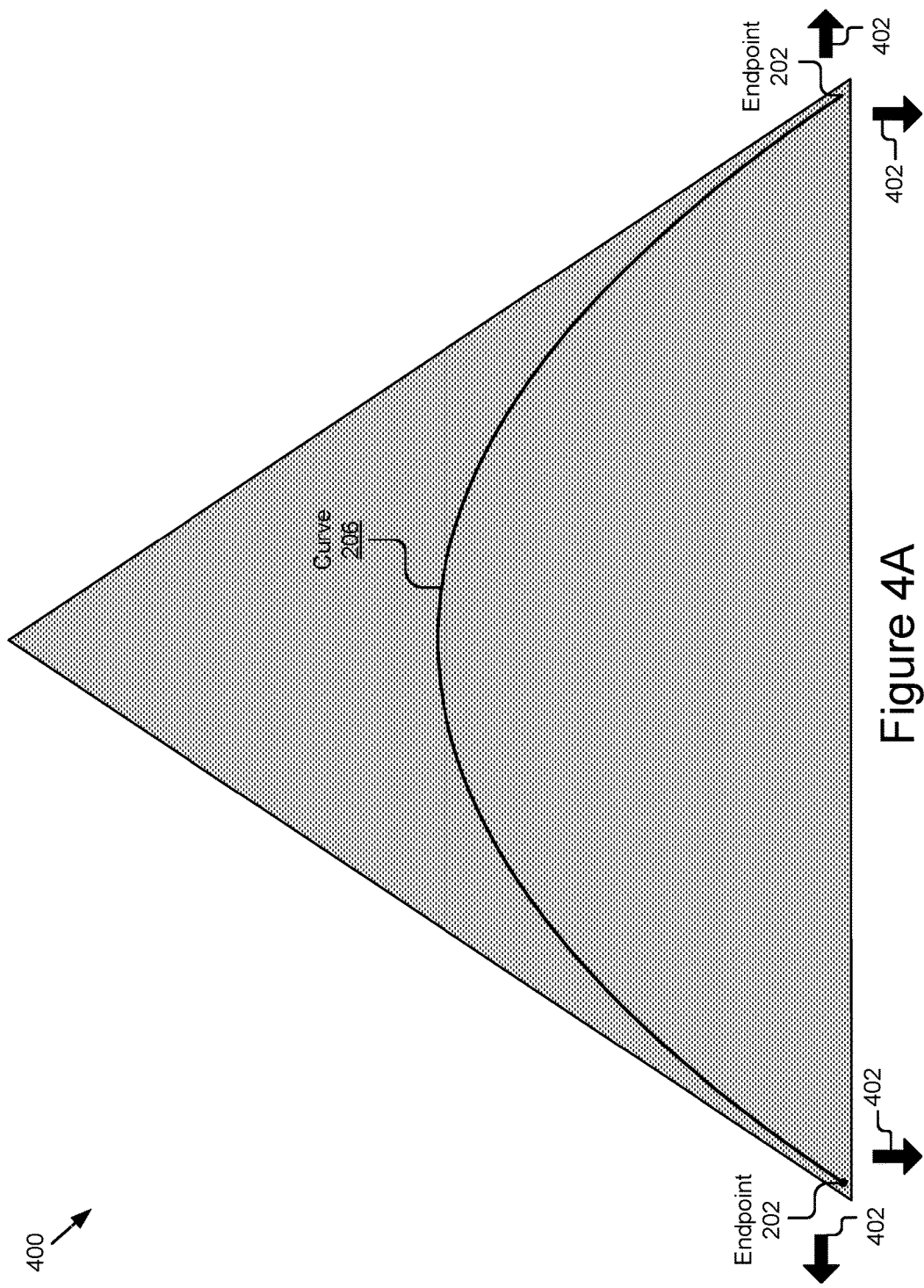
FIG. 4A is a diagram of an example resized control polygon.
Figure 4B:
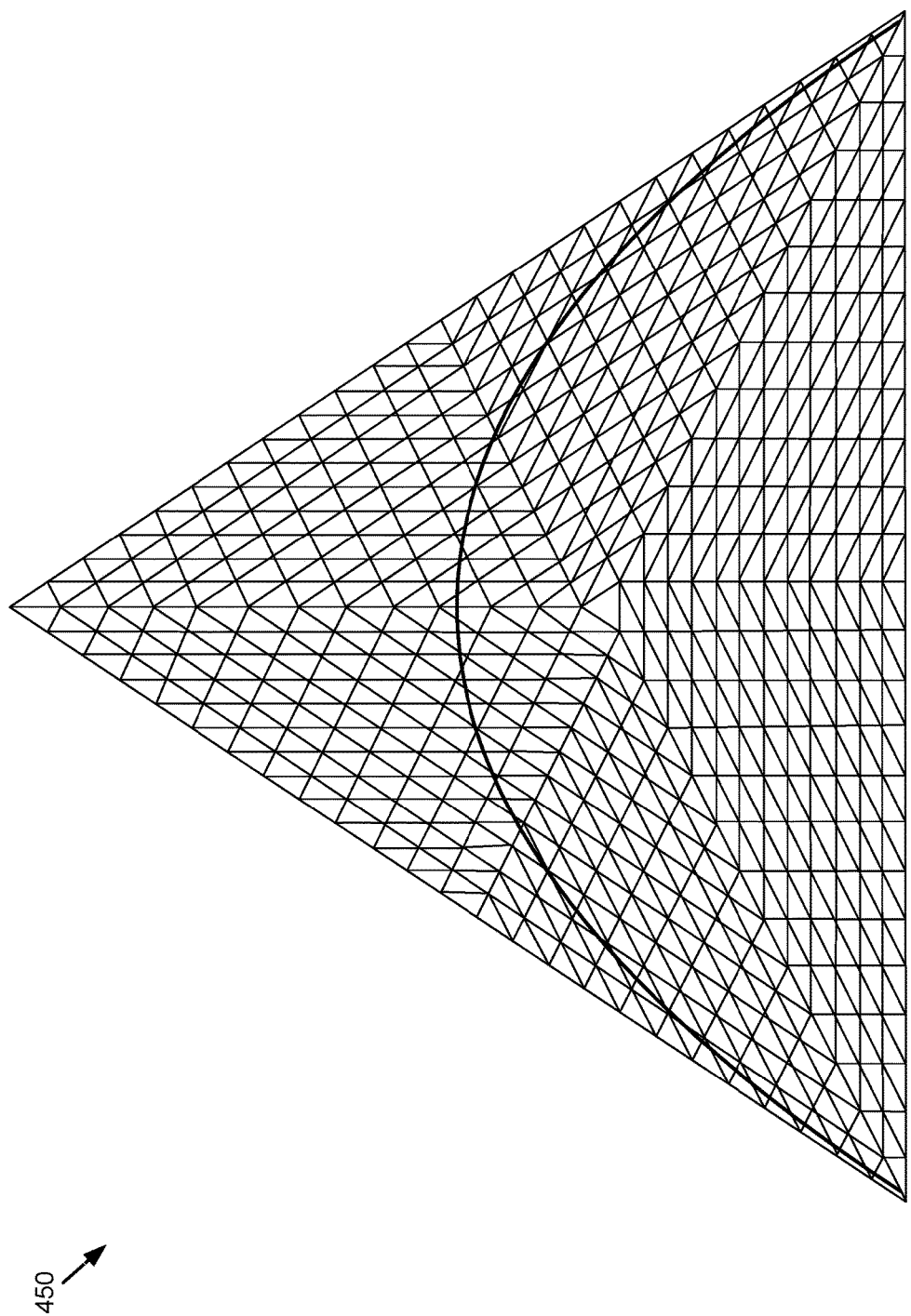
FIG. 4B is a diagram of an example tessellated control polygon.

The vertex shader 152 may determine properties (e.g., position) of a given vertex of a control polygon, such as the control polygon depicted in FIG. 4B. A vertex shader 152 may expect input such as uniform variables (e.g., constant values for each invocation of the vertex shader) and vertex attributes (e.g., per-vertex data). In some embodiments, the vertex shader 152 may deduce texture coordinates of the control polygon based on the upload order of the vertex data. For example, the vertex data may be uploaded in a specific node order, e.g., the vertex with the (0, 0) texture coordinates may be first, followed by the vertex with the (1, 1) texture coordinates, followed by the vertex with the (½, 0) texture coordinates. In some embodiments, the vertex input 115 does not explicitly include texture coordinates as the texture coordinates may be fixed for a given curve (e.g., quadratic Bezier curve [(0, 0) (1, 1), and (½, 0)]).

The tessellation shader 154 comprises program instructions that are executable by the GPU 170 to determine tessellation level(s) for the control polygon (also called a patch or layout), subdivide the patch into tiles (also called primitives) at the determined tessellation level(s), map the subdivision, and output the tiles to the geometry shader 156 or the rasterizer 158. In some further embodiments, the GPU pipeline may be configured to bypass the geometry shader 156 and output the primitives to the rasterizer 158.

The tessellation shader 154 may tessellate a control polygon having any number of vertices. Thus, while triangular or quadrilateral control polygons are used as examples herein, it should be understood that other layouts are also possible and contemplated. Additionally, the primitives output by the tessellation shader 154 may take different forms depending on the implementation, such as lines, triangles, quadrilaterals, etc.

Non-limiting examples of a tessellation shader 154 may include OpenGL's tessellation control shader (TCS) and/or the OpenGL's tessellation evaluation shader (TES), a tessellation primitive generator, etc., although it should be understood that any suitable shader capable of performing the operations described herein may be utilized and applicable.

The geometry shader 156 comprises program instructions that are executable by the GPU 170 to select and process the primitives output by the tessellation shader 154. In particular, the geometry shader 156 may receive a primitive from the tessellation shader 154, processes the primitive into further primitives, change the topology of the primitive(s), select a subset of primitives for stroking the curve, and output primitive(s) including the selected subset to the rasterizer 158.

A non-limiting example of the geometry shader 156 may include OpenGL's geometry shader 156, although it should be understood that any suitable shader capable of performing the operations described herein may be utilized and is applicable.

The rasterizer 158 comprises program instructions that are executable by the GPU 170 to rasterize a selection of tiles determined by the geometry shader 156 into fragments for processing by the fragment shader 160.

The fragment shader 160 comprises program instructions that are executable by the GPU 170 to anti-alias the curve, which reduces the distortion artifacts when representing the curve at resolutions lower than a native resolution. The curve is then output for display by the fragment shader 160. In particular, the fragment shader 160 processes fragments rasterized by the rasterizer 158 (e.g., using a sub-selection of tiles situated proximate the curve within a certain range). This results in the fragment shader 160 anti-aliasing both sides of curve without having to process the fragments beyond an initial range, such as fragments having texture coordinates (e.g., [u, v] or [k, l, m]) outside the predetermined threshold discussed above. Instead, the fragments lying outside the initial rage may be discarded, which advantageously reduces GPU processing time.

The vertex shader 152, tessellation shader 154, geometry shader 156, rasterizer 158, and fragment shader 160 are discussed in further detail below with reference to at least FIGS. 2A-8.

The components of the GPU program code 151 (e.g., 152, 154, 156, 158, and/or 160) may be coupled for communication with one another by a communications bus and/or one or more execution units 140. The components of the GPU program code 151 may be coupled to the memory 150 and/or other information sources to store and/or retrieve data. Further, while the components of the GPU program code 151 are depicted as being distinct components, it should be understood that these components, and/or operations performed by these components, may be combined and/or further divided in the additional components without departing from the scope of this disclosure. Further, it should be understood that other graphics processing operations may also be performed in conjunction with the techniques described herein, such as pixel shading, and/or other suitable operations.

Figure 2A:
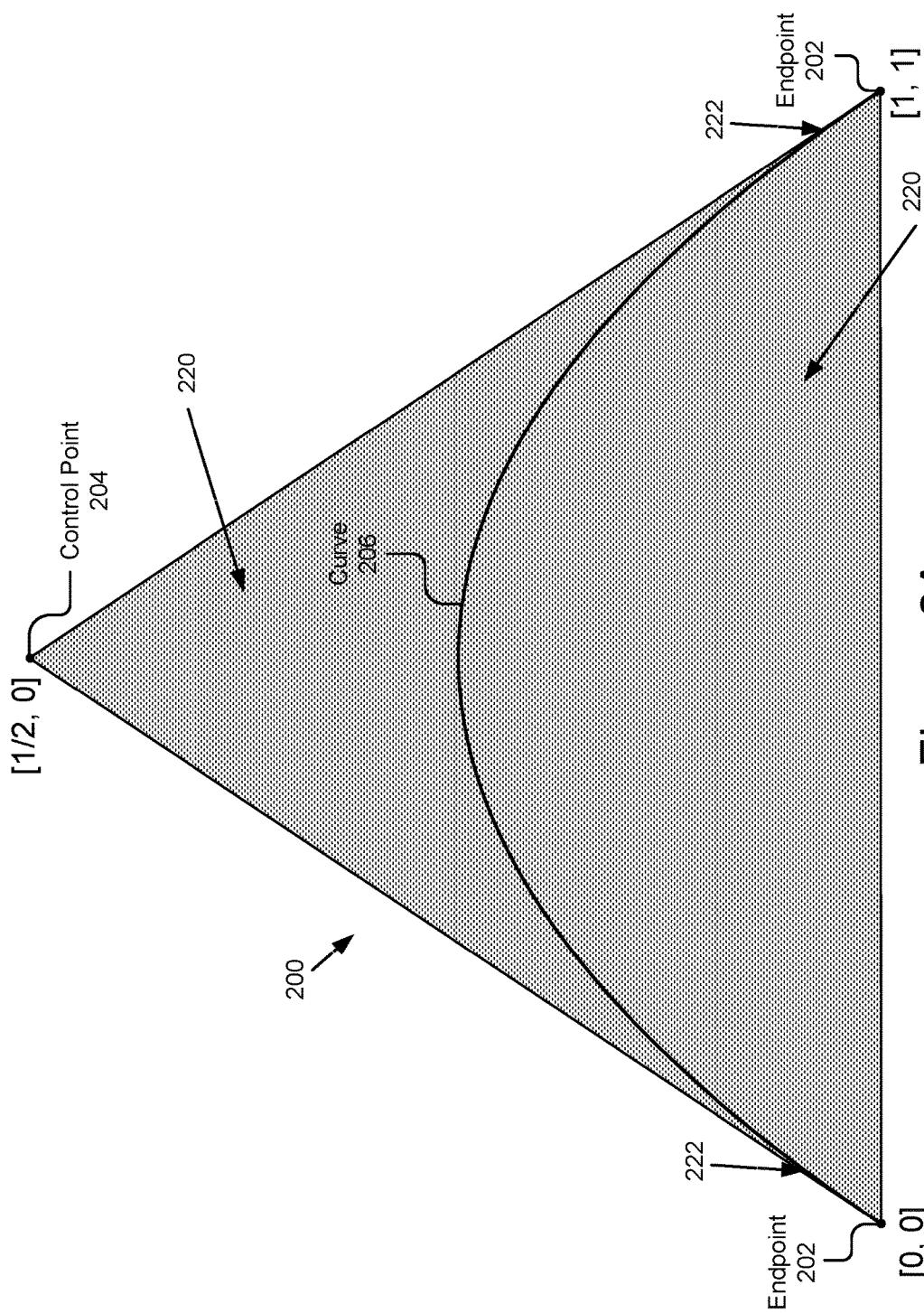
FIGS. 2A and 2B are diagrams of example control polygons.
Figure 2B:
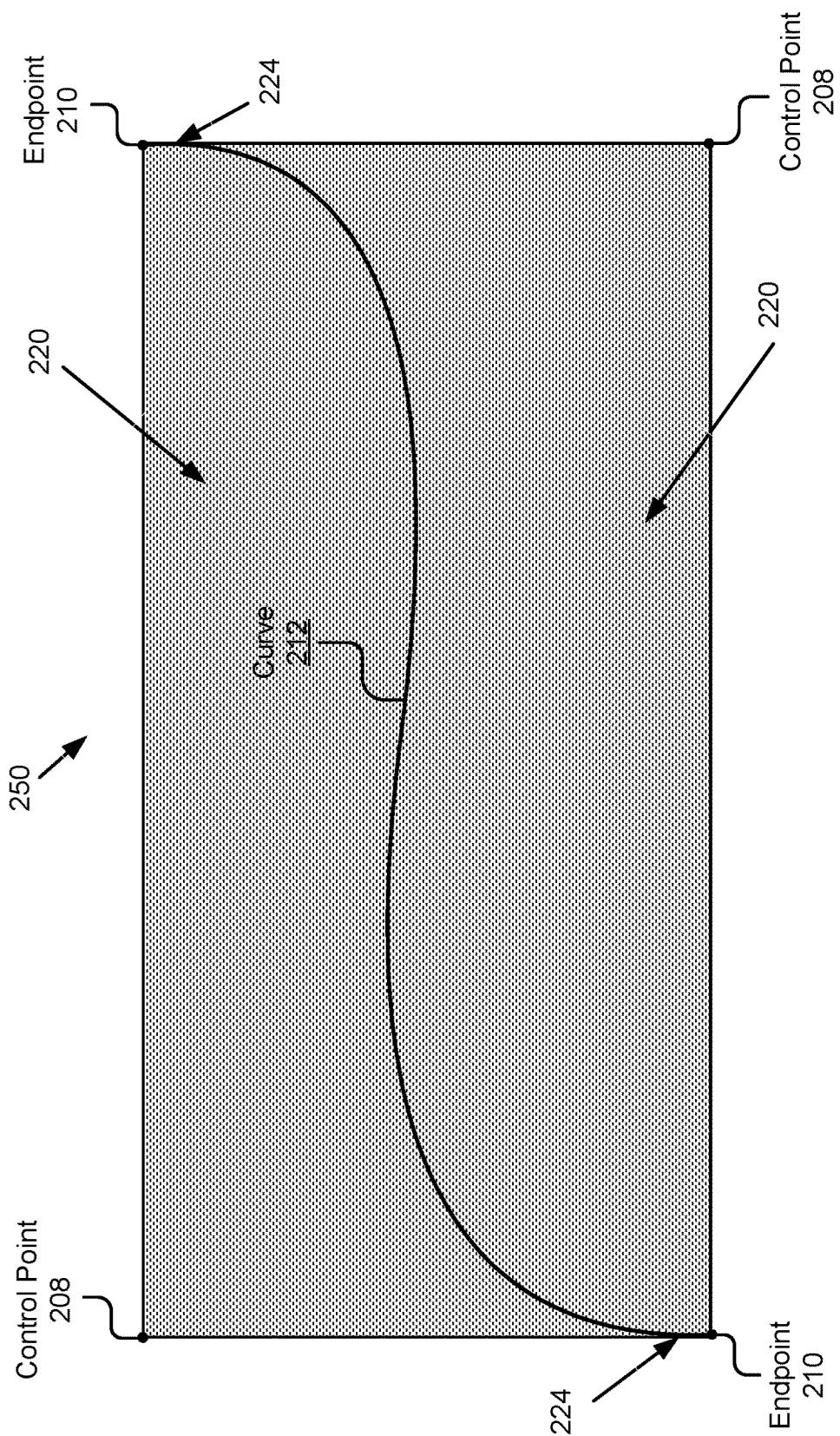
Figure 3:
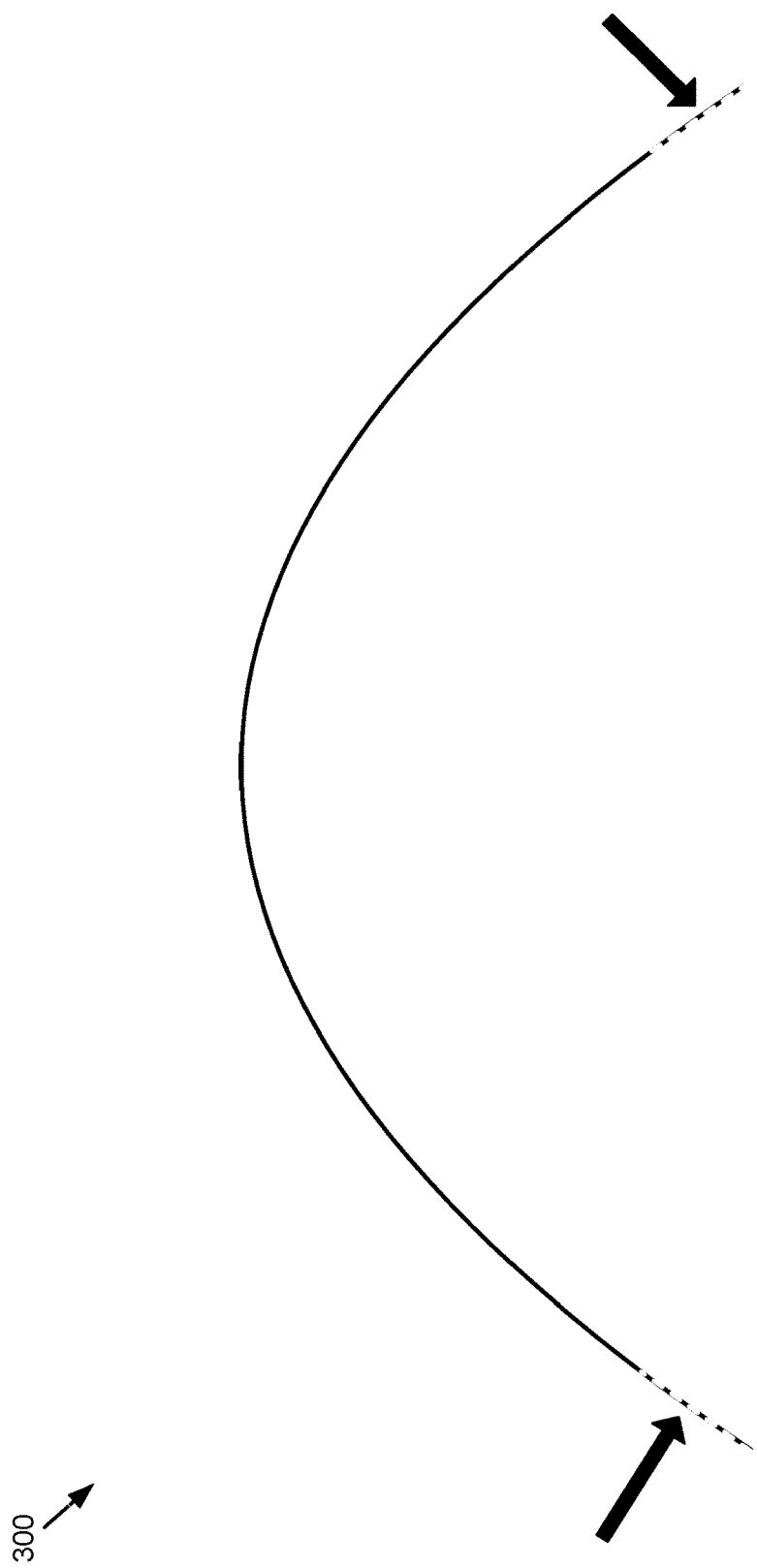
FIG. 3 is a diagram illustrating an example curve with broken/intermittent line-ends.

FIGS. 2A and 2B are diagrams of example control polygons including corresponding quadratic Bezier curve and cubic Bezier curve (also referred to herein as a Bezier curve, or simply a curve, line, or line segment). In particular, FIG. 2A is an example of a control triangle 200 and FIG. 2B is an example of a control quadrilateral 250. A control polygon may be formed by the endpoints of the curve and one or more control points. For example, the triangle 200 in FIG. 2A may be formed by the two endpoints 202 and one control point 204 of the quadratic Bezier curve 206 and the quadrilateral 250 in FIG. 2B may be formed by the two endpoints 210 and two control points 208 of the cubic Bezier curve 212. It should be understood that the examples depicted in FIGS. 2A and 2B are provided by way of example and that other layouts are also possible and may be fitted to a suitable curve.

As is apparent from FIGS. 2A and 2B, the total number of pixels (or fragments) in the control polygons 200 and 260 is significantly greater than the number of pixels (or fragments) comprising the Bezier curves 208 and 212. Over-coverage occurs when there is a disproportionate number of pixels in the control polygon of the curve relative to the pixels that form the curve and the pixels outside of the curve within a predetermined distance. For example, processing all the pixels within the control polygon 200 or 250 results in significant over-coverage because a majority of the pixels (excess pixels 220) are well outside of the curve 208 or 212, and processing these excess pixels 220 is unnecessary to suitably render the curve 208. Without the benefit of the technology described in this disclosure, this over-coverage (also sometimes referred to as over-fill) would present a significant performance bottleneck in renderings containing hundreds of thousands of Bezier curves.

On the other hand, under-coverage occurs when there is insufficient (e.g., less than a pixel) space between the control polygon 200 or 250 and the portions of the curve 222 or 224 near the endpoints 202 or 210. For instance, as the ends 222 or 224 of the curve 208 or 212 approach the endpoints 202 or 210, they become tangent to the sides of the control polygon 200 or 250. Without the benefit of the technology described in this disclosure, the respective ends 222 or 224 of the curve 208 or 212 at the corners of the control polygon 200 or 250 are under-covered, and the rasterizer 158 may be unable to fully resolve the stroke. This results in the ends of the curve appearing broken and/or intermittent, as the curve 300 shown in FIG. 3 portrays.

Advantageously, the vertex shader 152 is configured to expand (e.g., enlarge) the control polygon by a certain amount (e.g., one pixel, three pixels) in locations proximate the endpoints of the curve. The vertex shader 152, upon determining the texture coordinates for the control polygon, may augment one or more of the texture coordinates to expand the control polygon by the certain amount. For instance, FIG. 4A depicts an expanded version 400 of the control polygon 200 from FIG. 2A. In this example, the vertex shader 152 enlarges the control polygon to include sufficient space at the two curve endpoints 202 of the curve 208. The vertex shader 152 extrapolates the texture coordinates of the control polygon 400 using the vertices of the original control polygon 200 and the distance the control polygon 200 is expanded in each direction as reflected by the arrows 402.

The enlarging of the control polygon by the vertex shader 152 (e.g., after incorporating the model view matrix as discussed below) is advantageous because it maintains resolution independence from the CPU, in comparison to less efficient solutions directed to addressing under-coverage that require generating augmenting triangles at both ends of the curve—a CPU dependent process that results in generating code for and processing the code with a CPU.

FIG. 4B is diagram of an example tessellated control polygon 450 tessellated by the tessellation shader 154. In some embodiments, the tessellation shader 154 may break down the enlarged control triangle into a plurality of tiles (e.g., small triangles, etc.) using the interpolated texture coordinates. In some embodiments, the TCS and the TES may be used to break down the enlarged control polygon, although other shaders capable of tessellation are also possible and contemplated.

The geometry shader 156 may receive data describing the tiles from the tessellation shader 154 and process the tiling data to determine a reduced subset of tiles therefrom. The geometry shader 156 may evaluate which tiles qualify based on their position relative to the curve and select those positioned within a threshold distance from the curve as described in more detail below.

In some embodiments, the geometry shader 156 may use the following method to determine which tiles should be selected and which should be discarded and not needed to draw the curve. The geometry shader 156 may discard the tiles that do not satisfy the following selection criteria:

Criterion 1: tiles through which the curve passes.
Criterion 2: tiles with at least one vertex within a certain vicinity of the curve (as determined by a certain tolerance). The remaining tiles that satisfy at least one of the selection criterion are then further processed as described below.

Figure 5A:
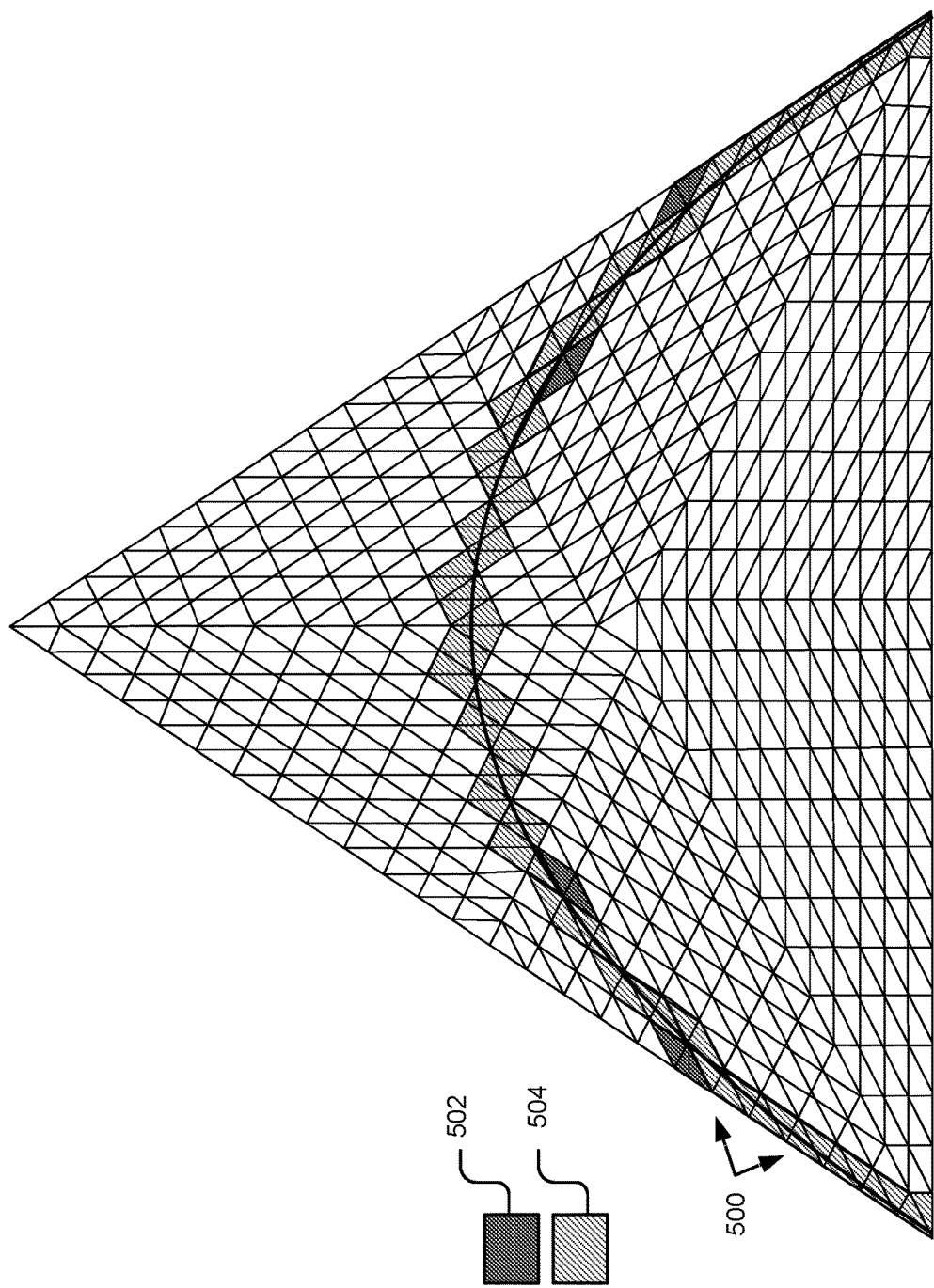
FIG. 5A is a diagram depicting an example selection of a subset of tiles.

FIG. 5A is a diagram depicting an example selection 500 of a subset of tiles. In particular, the tiles having fill that matches fill 504 are selected under criterion 1 and the tiles having fill that matches fill 502 are selected under criterion 2. The selected subset of tiles 500 includes significantly fewer tiles (e.g., approximately 90% fewer, approximately 75%-95% fewer) than the total number of tiles generated by the tessellation shader. This advantageously optimizes coverage, which in-turn significantly increases the speed at which the curve can be rasterized and anti-aliased.

Figure 5B:
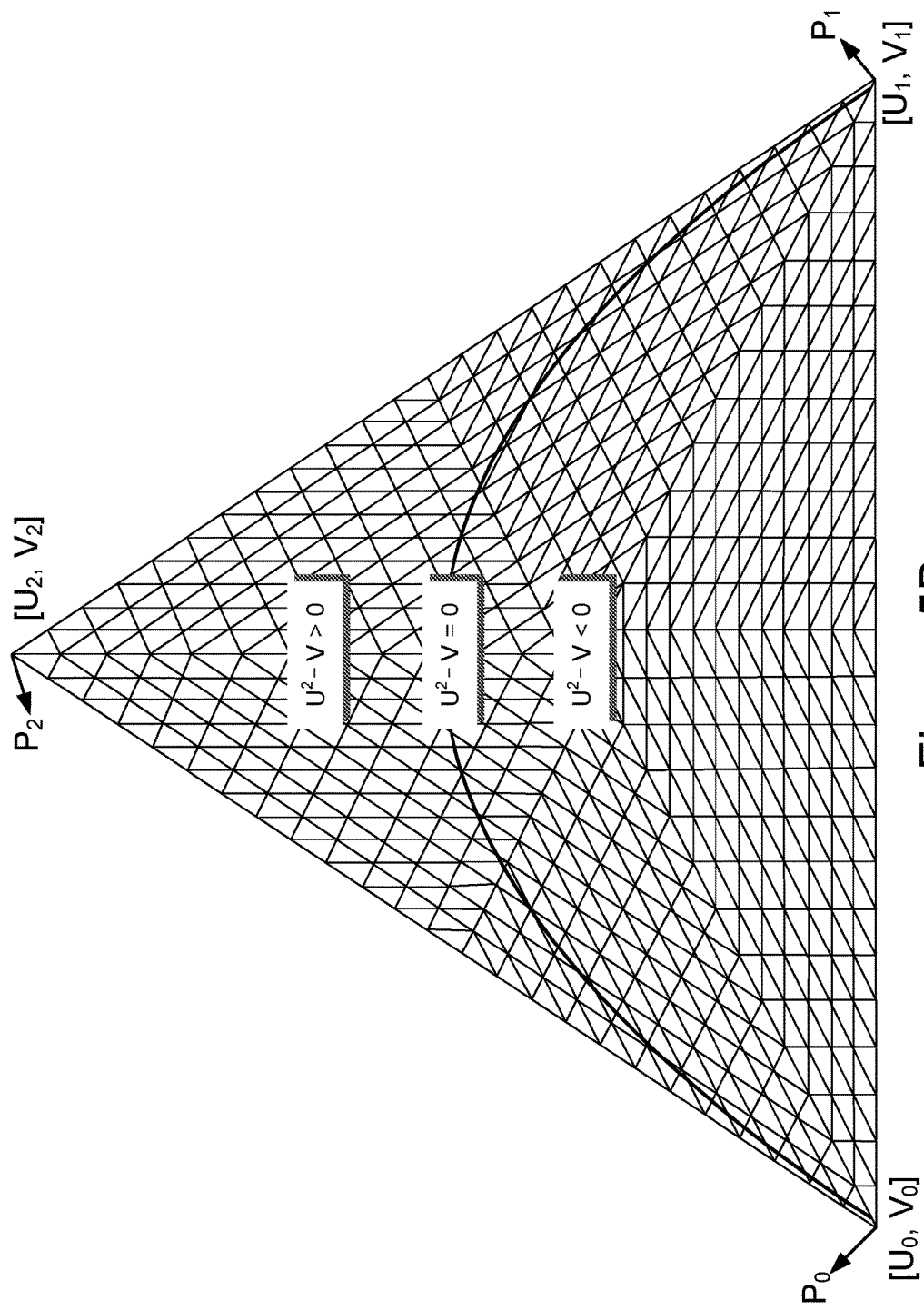
FIG. 5B is a diagram depicting an example quadratic curve, an example tessellated triangular field of tiles, and example tile selection formulas for selecting tiles from the tessellated triangular field.

FIG. 5B is a diagram depicting an example quadratic curve, an example tessellated triangular field of tiles, and example tile selection formulas for selecting tiles from a tessellated triangular field. In this example, any point that resides on the curve satisfies the equation $u^2-v=0$, where u, v are texture coordinates. Any point that lies inside the curve satisfies the equation $u^2-v<0$ while any point outside the curve satisfies the equation $u^2-v>0$.

Applying these equations to the vertices of the tiles, any tile through which the curve passes has at least one vertex (or a portion thereof) inside ($u^2-v<0$) and at least one vertex (or a portion thereof) outside the curve ($u^2-v>0$). These satisfy criterion 1 (are tiles through which the curve passes). For criterion 2, the geometry shader 156 computes the distance ($u^2-v$) from the curve to each of the vertices forming the tile (in this case a small triangle). Each vertex distance is compared to the predetermined threshold, and if it is within that threshold (e.g., within a certain distance threshold from the curve), the tile is flagged as selected. If not, the tile is discarded. An example distance threshold may be at least portion of the height (e.g., 25%, 50%, 75%, 100%, 100%+) of a tile, although it should be understood that other values may apply (1.5×, 2× the height of a tile). In some cases, the threshold may be the same or different based on the shape of the tile (e.g., triangle, irregular polygon, quadrilateral). In some cases, the threshold may change (may be dynamically determined or a set of thresholds may be predetermined) based on the location along the curve. In further cases, the threshold may be the same regardless of location along the curve.

Figure 5C:
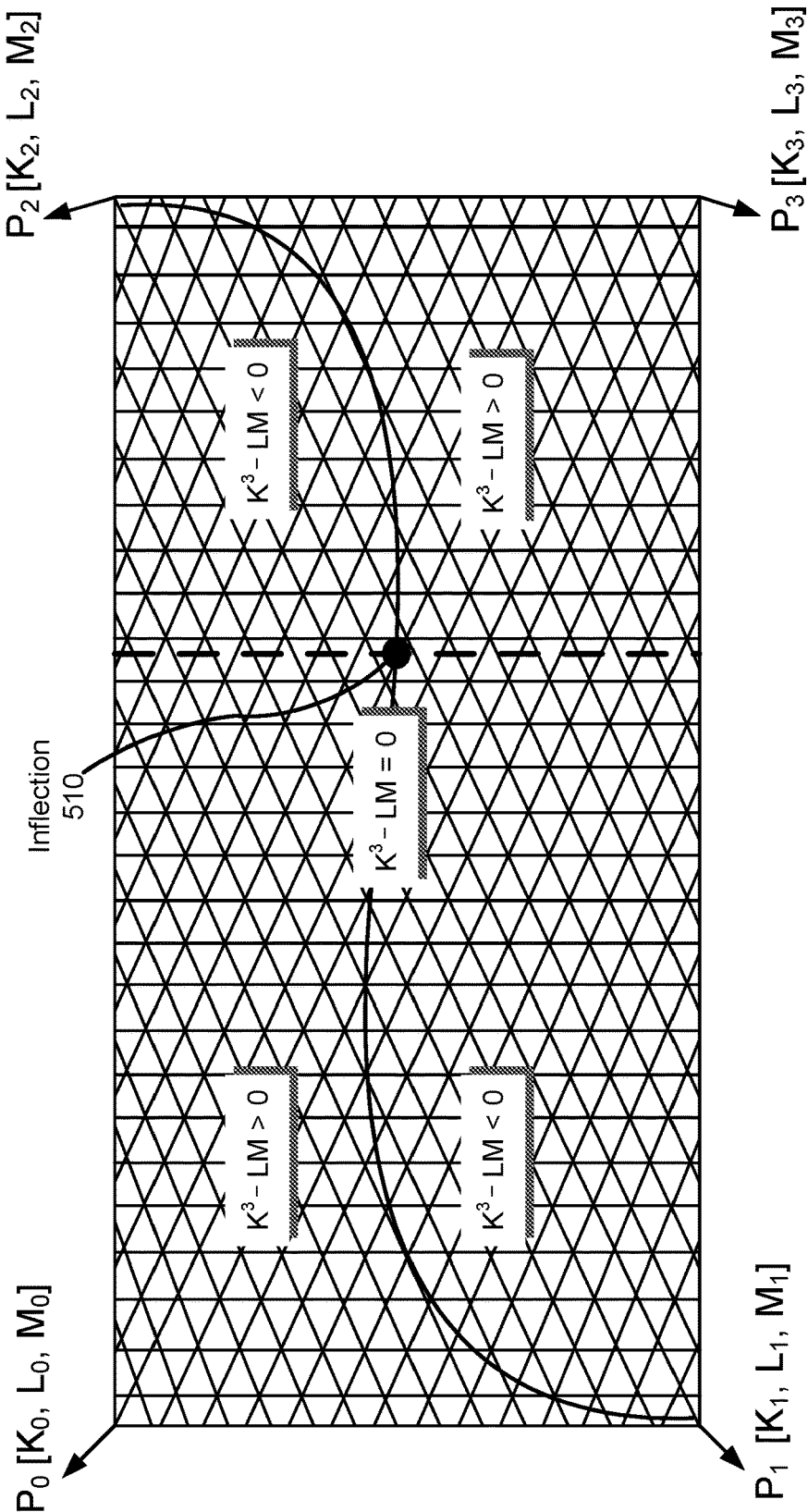
FIG. 5C is a diagram depicting an example cubic curve, an example tessellated quadrilateral field of tiles, and example tile selection formulas for selecting tiles from the tessellated quadrilateral field.

FIG. 5C is a diagram depicting an example cubic curve, an example tessellated rectangular field of tiles, and example tile selection formulas for selecting tiles from the tessellated rectangular field. In this example, the same criteria as those discussed above are applicable, although the formula used to select or discard the tiles are different because the curve formula is different (cubic vs. quadratic). In particular, as one would appreciate from the figure, to the left of the inflection point 510, the formula for selecting tiles located above (outside) the curve is $k^3-l*m>0$, the formula for selecting tiles that intersect the curve is $k^3-l*m=0$, and the formula for selecting tiles located below (inside) the curve is $k^3-l*m<0$. To the right of the inflection point 510, the inverse applies. Specifically, the formula for selecting tiles located above (inside) the curve is $k^3-l*m<0$, the formula for selecting tiles that intersect the curve is $k^3-l*m=0$, and the formula for selecting tiles located below (outside) the curve is $k^3-l*m>0$. In this case, the distance is determined using ($k^3-l*m$) and compared to a certain distance tolerance, as discussed above.

The subset of tiles selected by the geometry shader 156 may be output to and processed by the rasterizer 158 of the GPU 170, which may rasterize these primitives into fragments in cases where rasterization is enabled.

The fragment shader 160 may process the fragments produced by the rasterizer 158. In some embodiment, the fragment shader 160 may anti-alias the curve by processing the fragments produced using the selected subset of tiles. As a further non-limiting example, the fragment shader 160 may perform alpha modulation/compute an alpha value for anti-aliasing utilizing a gradient function along with a chain rule, such as that described in Loop-Blinn, although other suitable variations are also possible and contemplated.

Figure 6:
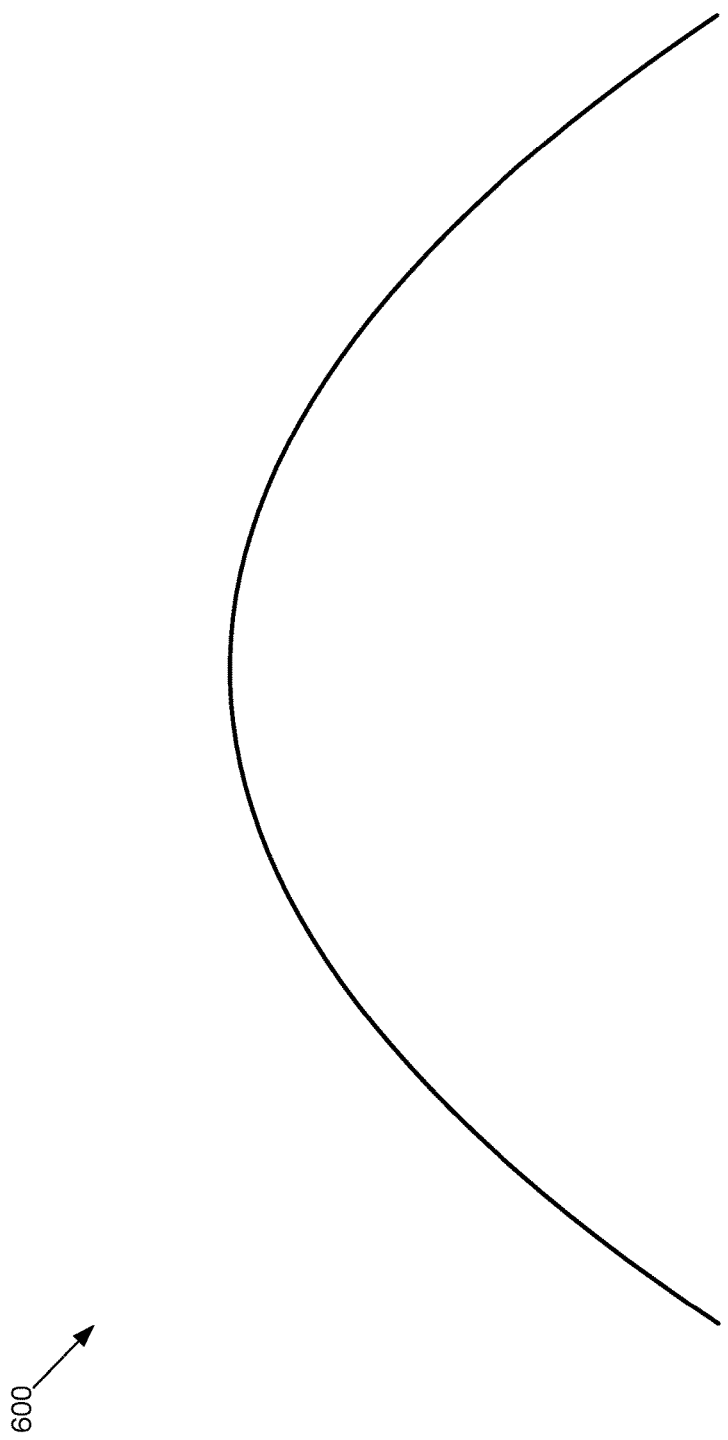
FIG. 6 is a diagram of an example rendered curve.

FIG. 6 is a diagram of an example curve 600 rendered based on the output of the fragment shader 160. As shown, this anti-aliased thin stroke includes line ends that are clearly resolved, and is beneficially produced in a resolution-independent, efficient manner, as discussed above.

Figure 7:
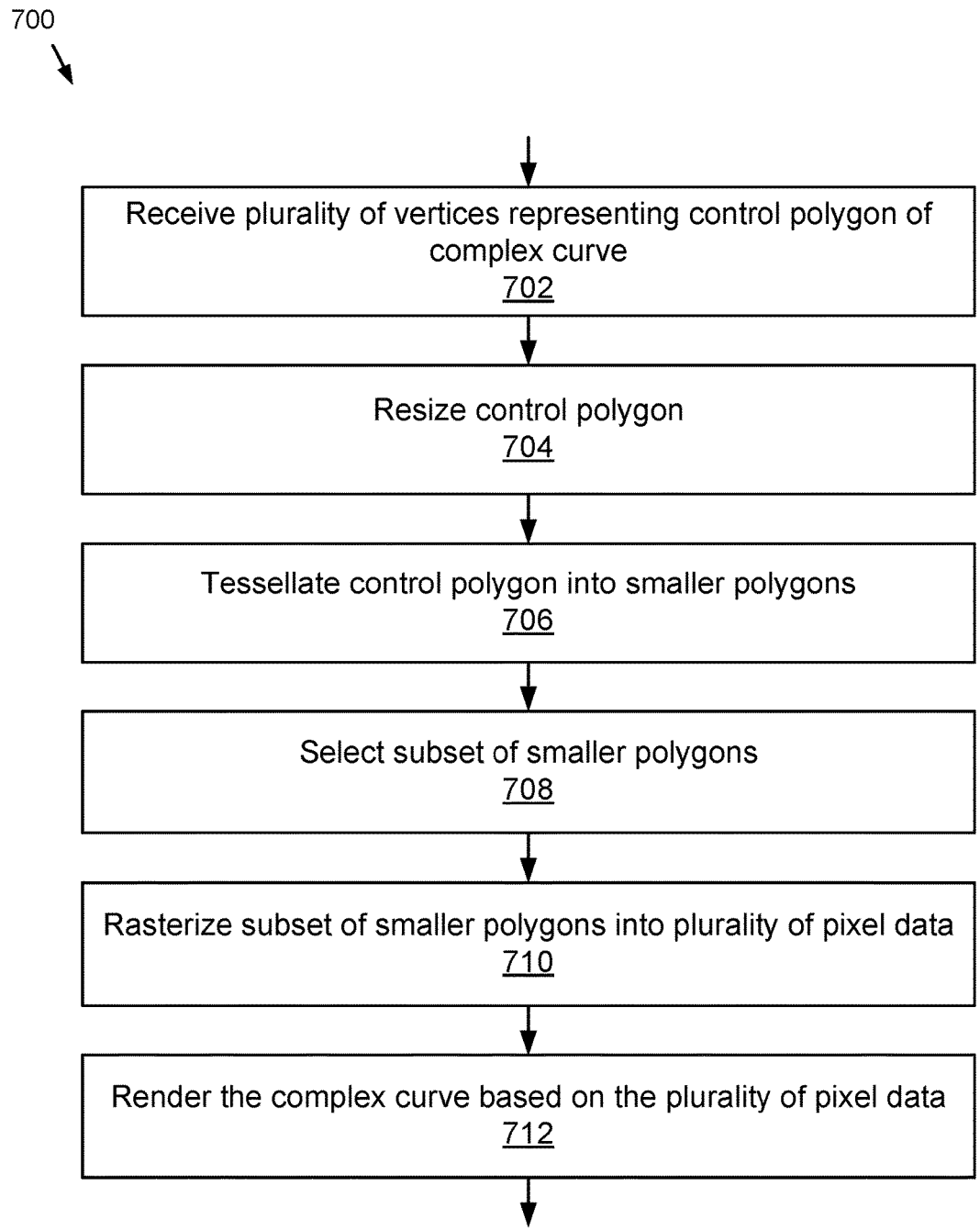
FIG. 7 is a flowchart of an example method 700 for generating a line segment for presentation.

FIG. 7 is a flowchart of an example method 700 for generating a line segment for presentation. In block 702, the vertex shader 152 receives a plurality of vertices representing the control polygon of a curve. The vertex shader 152 resizes the control polygon in block 704. In block 706, the tessellation shader 154 uses data describing the resized control polygon (e.g., by retrieving it from memory) and tessellates the control polygon into a plurality of polygons (also called tiles or primitives). The geometry shader 156, using the output generated by the tessellation shader 154, selects a subset of the polygons in block 708. In some embodiments, the rasterizer 158 rasterizes the subset of polygons into a plurality of fragments. Each fragment represents a sample-sized segment of a corresponding rasterized polygon. The fragment shader 160 processes the plurality of fragments to determine color and depth information for the fragments. The GPU program code 151 then computes and outputs to the framebuffer the final pixel data using the fragment data (the fragments and data processed by the fragment shader 160).

Figure 8:
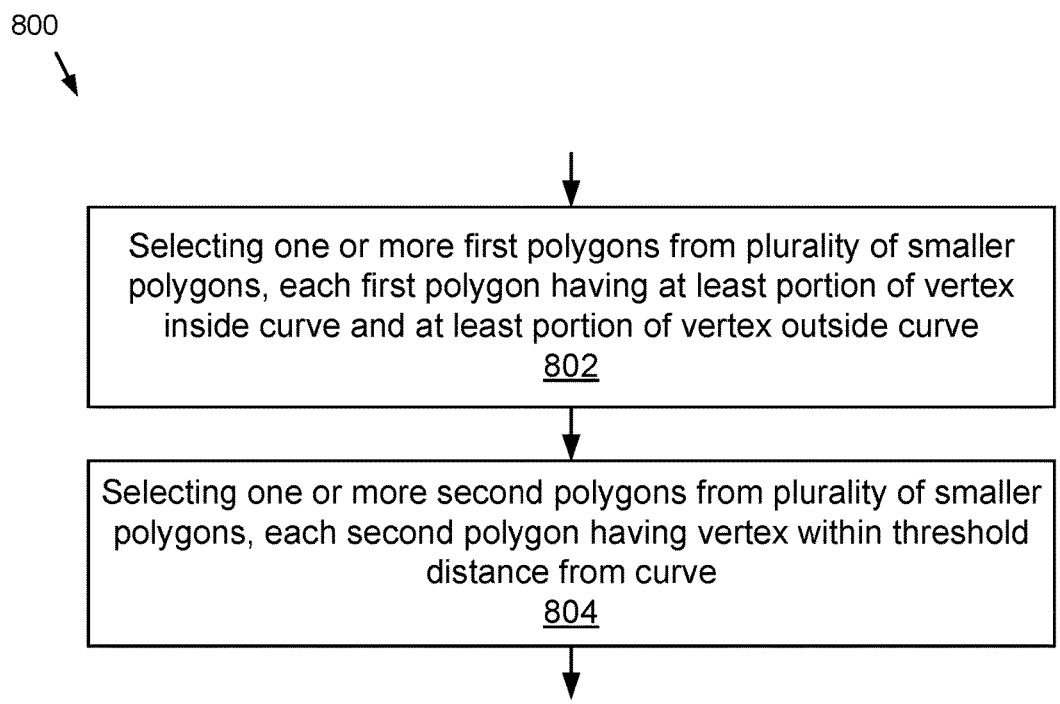
FIG. 8 is a flowchart of an example method for selecting a subset of tiles.

FIG. 8 is a flowchart of an example method 800 for selecting a subset of tiles. In some embodiments, the method 800 represents operations that may be performed under block 708, although it should be understood that other methods for selecting tiles are also possible and contemplated, as discussed elsewhere herein.

In block 802, the geometry shader 156 may select one or more first polygons from a plurality of polygons tessellated by the tessellation shader 154 based on each of the first polygons having at least a portion (e.g., part or all) of the polygon (e.g., a vertex) inside the curve and at least a portion of the polygon (e.g., a different vertex) outside the curve. In block 804, the geometry shader 156 may select one or more second polygons from the plurality of polygons based on each of the second polygons having a vertex within a threshold distance from the curve. The selected first and second polygons form a subset of polygons that are used to rasterize and anti-alias the curve.

FIG. 9 is a block diagram illustrating constituent elements of a computer system 900, which is configured to execute line drawing operations using a GPU 170, as discussed elsewhere herein. The computer system 900 may include one or more processors 910 implemented using any desired architecture or chip set, such as the SPARC™ architecture, an x86-compatible architecture from Intel Corporation or Advanced Micro Devices, ARM architecture, or another suitable architecture or chipset capable of processing data. Any desired operating system(s) may be run on the computer system 900, such as various versions of UNIX, Linux, Windows™ from Microsoft Corporation, MacOS™ from Apple Corporation, or any other operating system that enables the operation of software on a hardware platform. The processor(s) 910, such as CPU, may be coupled to one or more of the other illustrated components, such as a memory 920, by at least one communications bus. One or more of the processor(s) may comprise the data source 110 in some embodiments.

In some embodiments, the GPU 170 may be included in a specialized graphics card or other graphics component 956, which is coupled to the processor(s) 910. Additionally, the computer system 900 may include one or more displays 952. In one embodiment, the display(s) 952 may be coupled to the graphics card 956 for display of data provided by the graphics card 956.

Program instructions 951 that may be executable by the processor(s) 910 to implement aspects of the techniques described herein may be partly or fully resident within the memory 920 at the computer system 900 at any point in time. As is described with reference to FIGS. 1 and 2, another or complimentary set of program instructions 151 may be provided to the GPU 170 for performing aspects of the techniques described herein on the GPU 170. The memory 920 may be implemented using any appropriate medium such as any of various types of ROM or RAM (e.g., DRAM, SDRAM, RDRAM, SRAM, etc.), or combinations thereof. The program instructions 951 may also be stored on a storage device 960 accessible from the processor(s) 910. Any of a variety of storage devices 960 may be used to store the program instructions 951 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 951 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions 951 may be implemented in various embodiments using any desired programming language, scripting language, or combination of programming languages and/or scripting languages, e.g., GLSL, C, C++, C#, Java™, Perl, etc. It will be apparent to those having ordinary skill in the art that computer system 900 can also include numerous elements not shown in FIG. 9, as illustrated by the ellipsis shown.

In various embodiments, the blocks shown in at least FIGS. 7 and 8, and/or operations discussed with reference to the other figures, may be performed in a different order than the illustrated order where suitable. Further, any of the operations may be performed programmatically (e.g., by a computer according to a computer program). Additionally, any of the operations may be performed automatically (i.e., without user intervention) or responsive to user input.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for stroking a curve comprising:
   receiving, at a graphics processing unit, a plurality of vertices representing a control polygon of the curve, wherein the graphics processing unit maintains resolution independence from a central processing unit by:
   expanding the control polygon of the curve in at least one location proximate at least one endpoint of the curve;
   tessellating the control polygon into a plurality of tiles;
   selecting a subset of tiles from the plurality of tiles based on each of the tiles of the subset satisfying a selection criterion;
   rasterizing the curve into fragments using only the selected subset of tiles that satisfy the selection criterion, wherein the selection criteria requires a tile in the plurality of tiles to have a vertex within a threshold distance from the curve; and
   rendering the curve based on the fragments.

2. The computer-implemented method of claim 1, comprising discarding unselected tiles of the plurality of tiles.

3. The computer-implemented method of claim 1, comprising interpolating texture coordinates of vertices of the plurality of tiles.

4. The computer-implemented method of claim 1, wherein rendering the curve comprises anti-aliasing the curve.

5. The computer-implemented method of claim 1, wherein the selection criterion requires that a tile in the plurality of tiles include a first vertex inside the curve and a second vertex outside the curve.

6. The computer-implemented method of claim 1, wherein the threshold distance is at least a portion of a height of one of the plurality of tiles.

7. The computer-implemented method of claim 1, wherein the curve is a quadratic Bezier curve or a cubic Bezier curve.

8. The computer-implemented method of claim 1, wherein a width of the curve is less than a device pixel.

9. The computer-implemented method of claim 1, comprising expanding the control polygon of the curve by a device pixel.

10. A system comprising:
a central processing unit;
a graphics processing unit; and
a memory coupled to the central processing unit and the graphics processing unit and storing instructions, which when executed, cause the graphics processing unit to perform operations comprising:
receiving a plurality of vertices representing a control polygon of a curve;
expanding, by maintaining resolution independence from the central processing unit, the control polygon of the curve in at least one location proximate at least one endpoint of the curve;
tessellating, by maintaining resolution independence from the central processing unit, the control polygon into a plurality of tiles;
selecting a subset of tiles from the plurality of tiles based on each of the tiles of the subset satisfying a selection criterion;
rasterizing the curve into fragments using only the selected subset of tiles that satisfy the selection criterion, wherein the selection criteria requires a tile in the plurality of tiles to have a vertex within a threshold distance from the curve; and
rendering the curve based on the fragments.

11. The system of claim 10, wherein the instructions further cause the graphics processing unit to perform operations comprising discarding unselected tiles of the plurality of tiles.

12. The system of claim 10, wherein the instructions further cause the graphics processing unit to perform operations comprising interpolating texture coordinates of vertices of the plurality of tiles.

13. The system of claim 10, wherein the selection criterion requires that a tile in the plurality of tiles include a first vertex inside the curve and a second vertex outside the curve.

14. The system of claim 10, wherein the threshold distance is at least a portion of a height of one of the plurality of tiles.

15. A non-transitory computer-readable medium storing a computer readable program, wherein the computer readable program when executed causes a graphics processing unit to perform operations comprising:
receiving a plurality of vertices representing a control polygon of a curve;
expanding, by maintaining resolution independence from a central processing unit, the control polygon of the curve in at least one location proximate at least one endpoint of the curve;
tessellating, by maintaining resolution independence from the central processing unit, the control polygon into a plurality of tiles;
selecting a subset of tiles from the plurality of tiles based on each of the tiles of the subset satisfying a selection criterion;
rasterizing the curve into fragments using only the selected subset of tiles that satisfy the selection criterion, wherein the selection criteria requires a tile in the plurality of tiles to have a vertex within a threshold distance from the curve; and
rendering the curve based on the fragments.

16. The non-transitory computer-readable medium of claim 15, wherein the computer readable program further causes the graphics processing unit to perform operations comprising discarding unselected tiles of the plurality of tiles.

17. The non-transitory computer-readable medium of claim 15, wherein the computer readable program further causes the graphics processing unit to perform operations comprising interpolating texture coordinates of vertices of the plurality of tiles.

18. The non-transitory computer-readable medium of claim 15, wherein the selection criterion requires that a tile in the plurality of tiles include a first vertex inside the curve and a second vertex outside the curve.

19. The non-transitory computer-readable medium of claim 15, wherein the threshold distance is at least a portion of a height of one of the plurality of tiles.

* * * * *